United States Patent
Jokiniemi et al.

(10) Patent No.: US 12,281,372 B2
(45) Date of Patent: Apr. 22, 2025

(54) METHOD AND SYSTEM FOR ASH TREATMENT

(71) Applicant: BETOLAR OYJ, Kannonkoski (FI)

(72) Inventors: Jorma Jokiniemi, Vantaa (FI); Daniel Lane, South Australia (AU); Anna Lähde, Toivala (FI); Olli Sippula, Kuopio (FI)

(73) Assignee: BETOLAR OYJ, Kannonkoski (FI)

( * ) Notice: Subject to any disclaimer, the term of this patent is extended or adjusted under 35 U.S.C. 154(b) by 692 days.

(21) Appl. No.: 17/445,998

(22) Filed: Aug. 26, 2021

(65) Prior Publication Data

US 2021/0388463 A1 Dec. 16, 2021

Related U.S. Application Data

(63) Continuation of application No. PCT/FI2020/050027, filed on Jan. 16, 2020.

(30) Foreign Application Priority Data

Feb. 28, 2019 (FI) .................................. 20195150

(51) Int. Cl.
    *C22B 7/02* (2006.01)
    *C22B 7/00* (2006.01)

(52) U.S. Cl.
    CPC ................ *C22B 7/02* (2013.01); *C22B 7/001* (2013.01)

(58) Field of Classification Search
    CPC .................................. C22B 7/001; C22B 7/02
    See application file for complete search history.

(56) References Cited

U.S. PATENT DOCUMENTS

| | | | | |
|---|---|---|---|---|
| 2,948,948 A | * | 8/1960 | Duplin, Jr. | C22B 7/02 264/43 |
| 4,159,310 A | * | 6/1979 | Reynolds | C22B 21/0046 423/78 |

(Continued)

FOREIGN PATENT DOCUMENTS

| | | |
|---|---|---|
| DE | 102008004796 B3 | 3/2009 |
| JP | H09227964 A | 9/1997 |

(Continued)

OTHER PUBLICATIONS

International Search Report issued by the European Patent Office acting as the International Searching Authority in relation to International Application No. PCT/FI2020/050027 dated May 13, 2020 (5 pages).

(Continued)

*Primary Examiner* — Ricardo D Morales
(74) *Attorney, Agent, or Firm* — Robert P. Michal, Esq.; Carter, DeLuca & Farrell LLP

(57) ABSTRACT

A method of the invention for treatment of particulate material for metal recovery includes heating a furnace to a first temperature, feeding a particulate material into the furnace, and before or after heating of the raw material, feeding a reducing gas flow through the furnace. The particulate material is heated in the furnace for volatilizing one or more metals contained in the ash into the gas flow, and the volatilized particles are recovered in one or more collection units. A system for treatment of particulate material for metal recovery includes a heated furnace for receiving flows of reduction gas and particulate material, a collection unit for volatilized particles, and a collection unit for non-volatilized material.

17 Claims, 4 Drawing Sheets

(56) References Cited

U.S. PATENT DOCUMENTS

Figure 1:
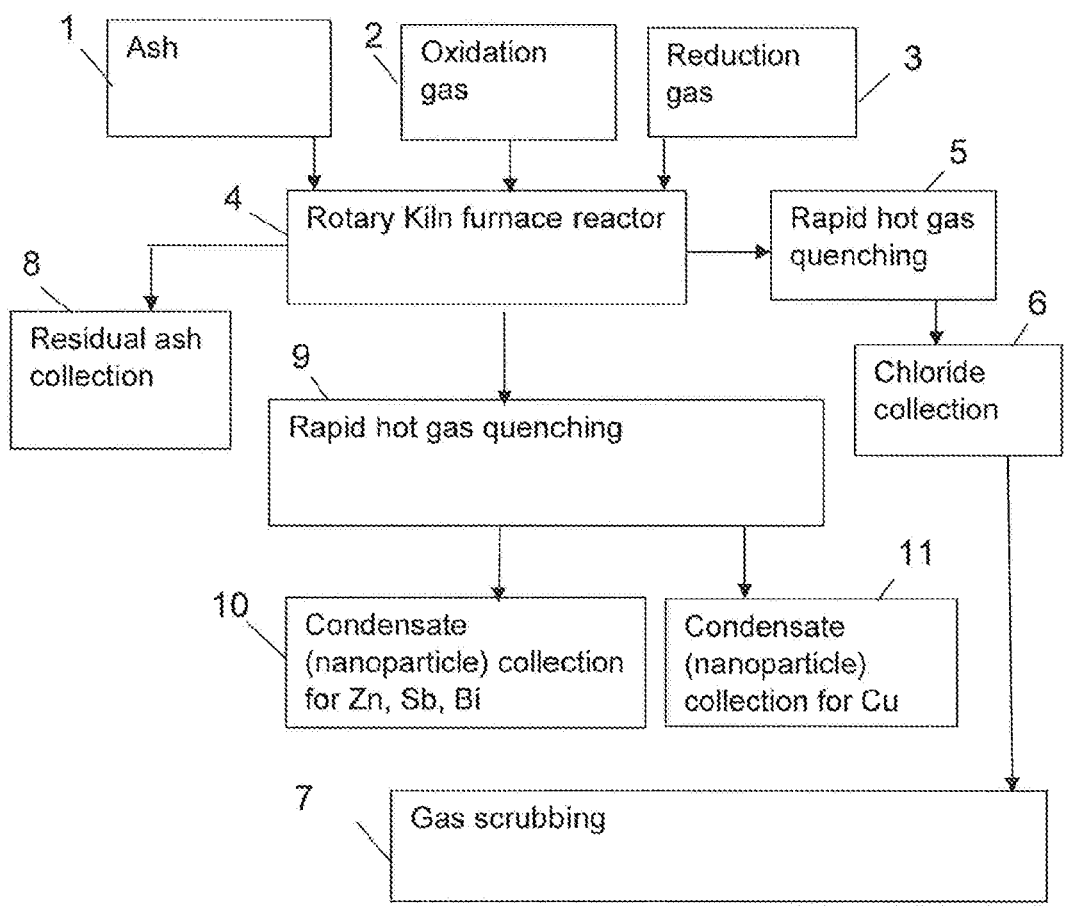

| | | | |
|---|---|---|---|
| 4,488,905 A | | 12/1984 | Santen |
| 4,643,110 A | * | 2/1987 | Lisowyj ................. C22B 41/00 |
| | | | 266/154 |
| 6,379,421 B1 | | 4/2002 | Salinas-Fernandez et al. |
| 2003/0159540 A1 | | 8/2003 | Frame et al. |
| 2010/0284874 A1 | * | 11/2010 | Cesnovar ................. C22B 7/02 |
| | | | 423/215.5 |

FOREIGN PATENT DOCUMENTS

| | | | |
|---|---|---|---|
| JP | H11293352 A | | 10/1999 |
| JP | 2003245642 A | * | 9/2003 |

OTHER PUBLICATIONS

Written Opinion of the International Searching Authority issued by the European Patent Office acting as the International Searching Authority in relation to International Application No. PCT/FI2020/050027 dated May 13, 2020 (7 pages).
Finnish Search Report issued by the Finnish Patent and Registration Office in relation to Finnish Application No. 20195150 dated Sep. 10, 2019 (2 pages).

* cited by examiner

METHOD AND SYSTEM FOR ASH TREATMENT

CROSS-REFERENCE TO RELATED APPLICATIONS

This application is a continuation of PCT International Application No. PCT/FI2020/050027 filed Jan. 16, 2020, which claims priority to Finnish Patent Application No. 20195150, filed Feb. 28, 2019, the disclosure of each of these applications is expressly incorporated herein by reference in their entirety.

TECHNICAL FIELD

The invention is concerned with an ash treatment method and system for recovering metals from combustion ashes.

BACKGROUND

Waste (or wastes) are unwanted or unusable materials and can consist of any substance, which is discarded after primary use, or is worthless, defective and of no use. Waste is produced by human activity, such as extraction and processing of raw materials.

Waste treatment refers to the activities required to ensure that waste has the least practicable impact on the environment. In many countries various forms of waste treatment are required by law.

Waste can be solid, liquid, or gaseous and each type has different methods of disposal and management. Waste management deals with all types of waste, including industrial, biological and household. The treatment of solid wastes is a key component of waste management.

Waste management (or waste disposal) are the activities and actions required to manage waste from its inception to its final disposal. This includes the collection, transport, treatment and disposal of waste, together with monitoring and regulation of the waste management process.

Resource recovery is using wastes as an input material to create valuable products as new outputs. The aim is to reduce the amount of waste generated. Resource recovery delays the need to use new raw materials in the manufacturing process. Materials found in municipal solid waste can be used to make new products. Plastic, paper, aluminum, glass and metal are examples of where value can be found in waste.

Incineration is a high-temperature waste treatment process that involves combustion of organic substances contained in waste materials, systems in such processes described as "thermal treatment". Systems that are generally considered to be thermal treatment include in general waste storage and feed preparation as well as combustion in a furnace, producing hot gases and a bottom ash residue for disposal. Any incineration facility will incorporate processes as waste storage and handling, processing to prepare waste, combustion, air-pollution control, and residue (ash) handling.

Waste incineration facilities generally consist of a number of unit operations associated with waste storage and reactor feedstock preparation; combustion of the waste itself; and handling of the hot product gases and ash residues.

Incineration of waste materials converts the waste into ash, flue gas and heat. The ash is mostly formed by the inorganic constituents of the waste. Bottom ash (also called bottom slag) is part of the non-combustible residue of combustion in a furnace or incinerator. Fly ash or flue ash, is a coal combustion product that is composed of the particulates (fine particles of burned fuel) that are driven out of boilers together with the flue gases. Ash that falls to the bottom of the boiler is also called bottom ash or bottom slag.

The ash and slag from waste combustion often contain considerable amounts of heavy metals and chlorine. The heavy metals are generally present in the ash or slag in the form of metal chlorides. This influences treatment processes for metal recovery and metal reuse. Ash treatment is a way of recovering metals from ash while simultaneously decreasing the toxicity of the ash.

Fly ash is generated in large quantities in waste incineration processes. Chlorides are commonly present in the fly ash produced by the incineration of hazardous materials, such as polyvinylchloride plastic. High concentrations of certain contaminants in fly ash make handling and disposal of fly ash difficult. These contaminants include readily leached chlorides, heavy metals, and persistent organic pollutants. In order to avoid adverse environmental effects from the disposal of fly ash, the content of soluble chlorides must be reduced. One of the options available today for chloride removal is leaching and displacement washing with a filter press.

Plasma technology is another prior art method for the management of fly ash and Air Pollution Control residues (APCr) generated from incinerators and other processes, wherein waste is processed through combustion e.g. to produce a fuel source as in waste-to-energy processes. It is used as a technology to deal with APC and fly ash disposal. Such a plasma-enhanced process allows material feedstocks to be fed into a sealed furnace and heated in a controlled environment using a plasma arc created by either a single or multiple plasma electrodes/torches. Applying intense temperature and ultra-violet light results in high rates of resource recovery and destruction and removal of hazardous components for waste disposal and waste treatment. The process chemistry can be designed to separate and recover valuable metals, minerals and other materials from the feedstock while destroying the hazardous elements, leaving behind a non-hazardous vitrified material. This vitrified material, can e.g. be employed as a building product for the construction industry.

Thus, a problem of the final disposal of the combustion ashes is their high content of chlorides and/or heavy metals, such as Lead (Pb), Cadmium (Cd) and Zinc (Zn). Especially, fly ash, is considered to be hazardous waste and special environmental aspects have to be taken into consideration at its treatment and disposal.

The term "metal production" refers to all processes involved in the conversion of a raw material, such as a metallic ore, to a final form in which the metal can be used for some commercial or industrial purpose.

An ore is an occurrence of geological materials that contains sufficient minerals with economically important elements, typically metals, that can be economically extracted from the deposit. The ores are extracted from the earth through mining in its free or combined state. The first step in conventional metal production involves some form of mining. They are then refined (often via smelting) to extract the valuable element, or elements.

Metal recycling; recovery, and resource efficiency are increasingly important as the supply of virgin raw materials diminishes. Secondary metallic materials from industrial processes and discarded consumer products are the new mines of our time.

Metal extraction from the incineration residue of municipal waste is not only environmentally beneficial but also profitable. Various types of ashes from different incineration techniques, such as fly ash, bottom ash and boiler ash, contain high concentrations of toxic metals compounds that are very hazardous from an environmental point of view and from a health perceptive.

Furthermore, scientists have concluded that there in the near future will be a lack of metals that is still one reason why these ashes should be taken care of so the contained metals could be recovered from these ashes. This can be done through chemical leaching. It has been determined that leaching of ashes should be carried out in acid solutions.

Thus, the use of bottom ashes, produced by the industrial incinerators, is a raw material resource that has been drawing attention to recover economically important metals. E.g. in the article "Metal Recovery from Bottom Ash of an Incineration Plant: Laboratory Reactor Tests" by Ismail Agcasulu and Ata Akcil, Published online: 13 Apr. 2017, two acidic reagents (HCl and $H_2SO_4$) and an alkali reagent (NaOH) have been used to recover metal values, such as Molybdenum (Mo), Vanadium (V), Nickel (Ni), Iron (Fe) and Copper (Cu) from the pre-treated bottom ash samples at varying concentrations.

U.S. Pat. No. 8,349,282 is mentioned as prior art for a method for recovering metals from fly ash by treating the fly ash with a wet chemical leaching process. Such a method is also disclosed in EP patent 2 786 070 B.

The availability of ashes, compared to ores, is considerably cheaper since no extra energy or man power is needed for its production.

Waste incineration ash residues generally have lower concentrations of metal values and different mineralogy to mined metal ores. Existing processes used for the beneficiation of mined metal ores are therefore seldom suitable for beneficiation of ashes.

The main recycling target of ashes today is to utilize the ashes as an earth filling material or as building material. However, fly ashes from waste incineration processes contain a considerable amount of chlorides and hazardous metals, such as Cadmium (Cd), Copper (Cu), Zinc (Zn), and Lead (Pb) and therefore cannot be used without some form of treatment. It would be much more economic to recover metals and remove chlorides from fly ashes and use the ashes in a useful application e.g. in the manufacture of building materials and end products of valuable metals.

OBJECT OF THE INVENTION

The object of this invention is, therefore, a more efficient process with which valuable metals are obtained for use and further processing.

SUMMARY

The method of the invention for treatment of particulate material for metal recovery comprises the steps of heating a furnace to a first temperature, feeding a particulate material into the furnace, and before or after heating of the raw material, feeding a flow of reducing gas through the furnace. The particulate material is heated in the furnace for volatilizing one or more metals contained in the ash into the gas flow, and the volatilized particles are recovered in one or more collection units.

The system for treatment of particulate material for metal recovery comprises a heated furnace for receiving flows of reducing gas and particulate material, a collection unit for volatilized aerosol particles, and a collection unit for non-volatilized material.

The preferable embodiments of the invention have the feature of the sub claims.

The heating step of the method can be performed in a flow-through reactor, such as a rotary kiln furnace, or in an induction furnace. If an induction furnace is used, no quenching is needed since the reducing gas is not significantly warmed up.

The volatilized metals to be recovered are diluted in a separate unit or in the cooling unit by rapid quenching when a flow-through reactor, such as a rotary kiln reactor, is used. The quenched metals can be recovered by collecting in e.g. a filter bag. The recovered metals can be utilized in various applications. E.g. NaCl, KCl, and $CaCl_2$) can be used as road salt and compounds like Zn/ZnO and Cu/CuO in electronics, paints, sunscreens, cosmetics, sensors, solar cells etc.

The non-volatilized metals and compounds being one or more of Silicon (Si), Calcium (Ca), Aluminum (Al), Iron (Fe), Cobalt (Co), Magnesium (Mg), Nickel (Ni), Phosphorus (P), Titanium (Ti), Arsenic (As), and Vanadium (V) and non-volatile forms of Sodium (Na) and Potassium (K) are residuals and separated, heated, and pulverized. The residual ash can be utilized in landfills, in concrete mixtures and as oxidation catalysts.

Raw Material

The raw material used in the invention is in the first-hand combustion ash, such as fly ash or bottom ash, but can also consist of other particulate material, such as construction waste, municipal waste, electronic waste or glass waste, which contain valuable volatile metals.

The raw material can e.g. be residual material from combustion processes in power stations or from waste incineration plants, such as slag or ash, usually called bottom ash or bottom slag. Especially, bottom ash is part of the non-combustible residue of combustion in a furnace or incinerator. Bottom ash is also ash that falls to the bottom of a coal-fired boiler. Waste incineration produces about 250-350 kg of ash or slag as a residual product from every ton of waste. The term "bottom ash" as used in this text includes all these residual products and materials.

Fly ash or flue ash, also known as pulverized fuel ash, is a coal combustion product that is composed of the particulates (fine particles of burned fuel) that are driven out of coal-fired boilers together with the flue gases. Depending upon the source and composition of the coal being burned, the components of fly ash vary considerably. All fly ash, however, includes substantial amounts of silicon dioxide ($SiO_2$) (both amorphous and crystalline), aluminum oxide ($Al_2O_3$) and calcium oxide (CaO). The minor constituents of fly ash depend upon the specific coal bed composition but may include one or more of the following elements or compounds found in trace concentrations (up to hundreds ppm):

Arsenic (As), Beryllium (Be), Boron (B), Cadmium (Cd), Chromium (Cr), hexavalent chromium, Cobalt (Co), Lead (Pb), Manganese (Mn), Mercury (Hg), Molybdenum (Mo), Selenium (Se), Strontium (Sr), Thallium (Tl), and Vanadium (V), along with very small concentrations of dioxins and PAH compounds. It also has unburnt carbon. In addition to boiler ash, the fly ash can be Air Pollution Control (APC) ash, which is ash from flue gas cleaning devices i.e. Electrostatic Precipitators (ESP) or Fabric Filters (FF). The term "fly ash" as used in this text includes all these residual products.

The term "combustion ash" as used in this text includes both bottom ash and fly ash.

The combustion ash used in the invention is especially bottom ash or fly ash and generally contains Silicon (Si), Calcium (Ca), Aluminum (Al), Chlorine (Cl), Sulphur (S), Cadmium (Cd), Zinc (Zn), Sodium (Na), Potassium (K), Iron (Fe), Cobalt (Co), Nickel (Ni), Copper (Cu), Lead (Pb), Bismuth (Bi), Zinc (Zn), Antimony (Sb) and Vanadium (V). Cu, Bi, Zn, and Sb are of special interest in the invention what comes to valuable metals. Sodium chloride (NaCl) and Potassium chloride (KCl) are useful products for use as e.g. road salts.

The Heating Steps Generally

The raw material is in the invention heated so that valuable metals could be recovered by volatilizing them in reducing conditions and by subsequent collecting.

If the raw material contains chlorides, those have to be removed first, which also take place by heating, but in oxidizing conditions, so that the chlorides would be volatilized and thereafter collected.

The heating of the combustion ash is in the invention performed by thermal treatment in a furnace that e.g. can be a flow-through reactor, such as a rotary kiln furnace, or an induction furnace.

The advantage with using an induction furnace is that the temperature of the ash can be raised to a high temperature very fast. Another advantage is that the gas flowing over the ash sample will not be warmed up significantly in an induction furnace.

In a flow-through reactor, such as in a rotary kiln furnace, the flowing gas is warmed up and is more easily interacting with the ash sample at least partly since the ash is more spread and along the walls of the furnace.

The heating is performed by thermal treatment in one or more steps in order to achieve volatilization of metals to be recovered, whereby the furnace is, depending on method step and metal to be volatilized, heated into a temperature of 800-1600° C., whereby the combustion ash is heated in 600-1400° C.

The heating is performed in temperatures and gaseous atmospheres, wherein the volatile compounds are vaporized in successive steps for removal of chlorides (when necessary) and for recovery of Zn and heavy metals. A typical recovery percentage for Zn, Cu, Sb, and Bi is 90%. The thermal treatment can be combined with dissolution. E.g. Zn is partly solved in acids.

Heating—Preliminary Step for Recovering Cd

The combustion ashes do not necessarily contain Cd but when that is the case, Cd is preferably volatilized and removed in a preliminary heating step in reducing conditions before performing the step of volatilizing chlorides in oxidizing conditions. The preliminary step is performed since Cd is valuable and hazardous and it is therefore more practical to remove the Cd separately. Cd is volatilized in reducing conditions in a relatively low temperature. $CdCl_2$ can also be volatilized in oxidizing conditions together with the other chlorides.

When Cd is volatilized separately, it is performed by leading a reducing gas through the furnace heated into a preliminary temperature for volatilizing Cd. The recovery of Cd is preferably performed in a temperature of around 500° C., especially when a rotary kiln furnace is used, and in a reducing $H_2/N_2$ atmosphere.

In some embodiments when heated in air, Cd can be recovered as $CdCl_2$, whereby a typical recovery percentage is 80%. The recovery takes place by quenching (when necessary) and subsequent collecting with filter bags.

Heating—First Step for Chloride Removal

The oxidizing gas for volatilizing chlorides being in the form of chlorides of one or more of Na, K, Cu, Pb, is a gas flow of air lead into the furnace. Especially fly ash contains Cu and Pb to be volatilized. The temperature in the first step for volatilizing the chlorides is sufficient for volatilizing those but below a temperature for volatilizing Zn, Sb and Bi.

When the furnace is a rotary kiln reactor, the temperature for volatilizing the chlorides is a temperature within 800° C.-1000° C. without volatilizing Zn, Bi, or Sb. Also, when the furnace is an induction furnace, the temperature for volatilizing the chlorides is a temperature within 800° C.-900° C.

The chlorides are removed by collecting by e.g. filter bags (after quenching when necessary) and they can be used as road salt in the form of chlorides. Typically, almost 100% of the chlorides can be recovered in the form of chlorides of Na, K, Cu, and/or Pb. Typical recovery percentages calculated as recovered metal from fly ash are Na (60%), K (80%), Cu (50%), and Pb (50%).

Heating—Second Step for Recovery of Zn, Bi, and Sn

The temperature in the second heating step is raised to be suitable for volatilizing Zn, Bi and/or Sn. When the furnace is a rotary kiln reactor, the temperature is around 1000° C. When the furnace is an induction furnace, the temperature is also around 1000° C. This step is preformed in reducing conditions of e.g. a mixture of nitrogen and hydrogen gases and/or carbon monoxide, CO, gas.

Sb, Bi, and/or Zn are volatilized as such and collected on e.g. filter bags (after quenching when necessary).

Typical recovery percentages are 80% for Zn and 50% for Cu when using fly ash. The recovery percentage of Cu can be up to 90% when using bottom ash. Typical recovery percentages are 90% for Bi and 80% for Sb.

The volatilized Zn is then separated from the combustion ash. End products from Zn (and Cu) such as cosmetics, paints, electronics, sensors, and nanomaterials can be manufactured. The reducing gas for volatilizing Zn is a mixture of nitrogen and hydrogen gases and/or carbon monoxide, CO, gas.

Heating—Third Step for Recovery of Cu and Other Heavy Metals

The temperature in the second step is sufficient for volatilizing Cu and/or other heavy metals (such as e.g. Silver (Ag). When the furnace is a rotary kiln reactor, the temperature is within 1000-1400° C. Also, when the furnace is an induction furnace, the temperature is 1000-1400° C.

The reducing gas for volatilizing Cu is as for Zn a mixture of nitrogen and hydrogen gases and/or carbon monoxide, CO, gas. Typical percentages for recovery for Cu is 50%-90%.

Cu is volatilized as such and collected on e.g. filter bags (after quenching when necessary).

The reducing conditions are caused by a mixture of nitrogen and hydrogen gases or by carbon monoxide. The heating can be performed in different atmospheres, such as in mixtures of air, nitrogen and hydrogen-nitrogen as well as in different heating rates and delays. The reduction of the metals takes place by means of the hydrogen or carbon monoxide. Metal reduction can be used for manufacturing of suitable materials for catalyst and water cleaning.

Summary of Heating Steps a) Preliminary heating step: For vaporizing Cd, when Cd is presented in the raw material. This is especially the case when the raw material consists of fly ash.

b) First heating step: For vaporizing different chlorides, when chlorides are presented in the raw material. This is especially the case when the raw material consists of fly ash.

c) Second heating step: For vaporizing Zn, Bi, and/or Sb.

d) Third heating step: For vaporizing Cu

Thus, when the raw material consists of e.g. bottom ash and does not contain chlorides, the preliminary heating step and the first heating step are missing and only the second and third heating steps are performed.

Recovery of the Volatilized Metals

After the metal volatilisation, the compounds to be recovered are flowing out from the furnace and they are cooled and collected on a filter and a cleaner, such as an Electro-Static Precipitator (ESP) or a bag filter.

The volatilized metals are first quenched in a separate unit or in the cooling unit when the reactor used is a flow-through reactor, such as a rotary kiln reactor. Quenching is not needed when an induction furnace is used.

When an induction furnace is used, nanoparticles are naturally formed when the heated material and volatilized material gets into contact with and is mixed with the reducing gas not warmed up.

The recovery is preferably performed in room temperature and in an atmosphere of air. The volatilized metals can be recovered by collecting on e.g. filter bags after a possible quenching step.

Treatment of Non-Volatilized Materials

The non-volatilized metals and other compounds are the residual ash what is left after heat treatment and collected from the bottom of the reactor. They are separated, heated, and pulverized by e.g. grinding and heat treatment in hydrogen gas ($H_2$) at a temperature of e.g. 850° C. The non-volatilized metals and compounds are one or more of Si, Ca, Al, Fe, Co, Cu, Ni, and V especially when using fly ash. End products for use as catalysts or treatment chemicals can be prepared from these.

Different fractions can be processed to a higher grade of refined products.

Such residual compounds are heated in 1300° C. and volatilized and quenched and collected on filter bags. End products, such as catalysts or water treatment chemicals can be prepared.

Goals

The goals of the invention to reduce hazardous substances in the ashes as well as to recover and refine metals in them are achieved with the process of the invention.

The invention solves the problems referred to in the background section and provides a method on one hand for removing volatile chlorine containing compounds (such as chlorides) and on the other hand for recovering valuable metals, where after the ash is not classified as dangerous anymore and can be prepared for final disposal in a safe way.

A further advantage is that the amount of the ash for final disposal can be reduced or totally neglected by treating the residual ash so that the metals therein (such as Ni, Co, and Fe) can be made to catalytic active materials and other minerals, such as silicon (Si), calcium (Ca), and aluminum oxides ($Al_xO_y$) work as carrier materials for active catalyst elements (such as Ni, Co, and Fe), whereby the need for stacking is removed or reduced.

Nanomaterials are advantageously prepared from volatilized compounds, such as Zn, Cu, Bi, and Sn when they are collected by rapid cooling, i.e. quenching. Care has to be taken at cooling and dilution so that the compounds are collected on the filter in a safe and careful manner. The recovered chlorides can be used as road salt, which can have minor amounts of chlorides of Pb and Cu. They can be separated from the road salt if needed.

In the following, the invention is described by means of some advantageous embodiments and examples to which the invention is not restricted.

FIGURES

Figure 2:
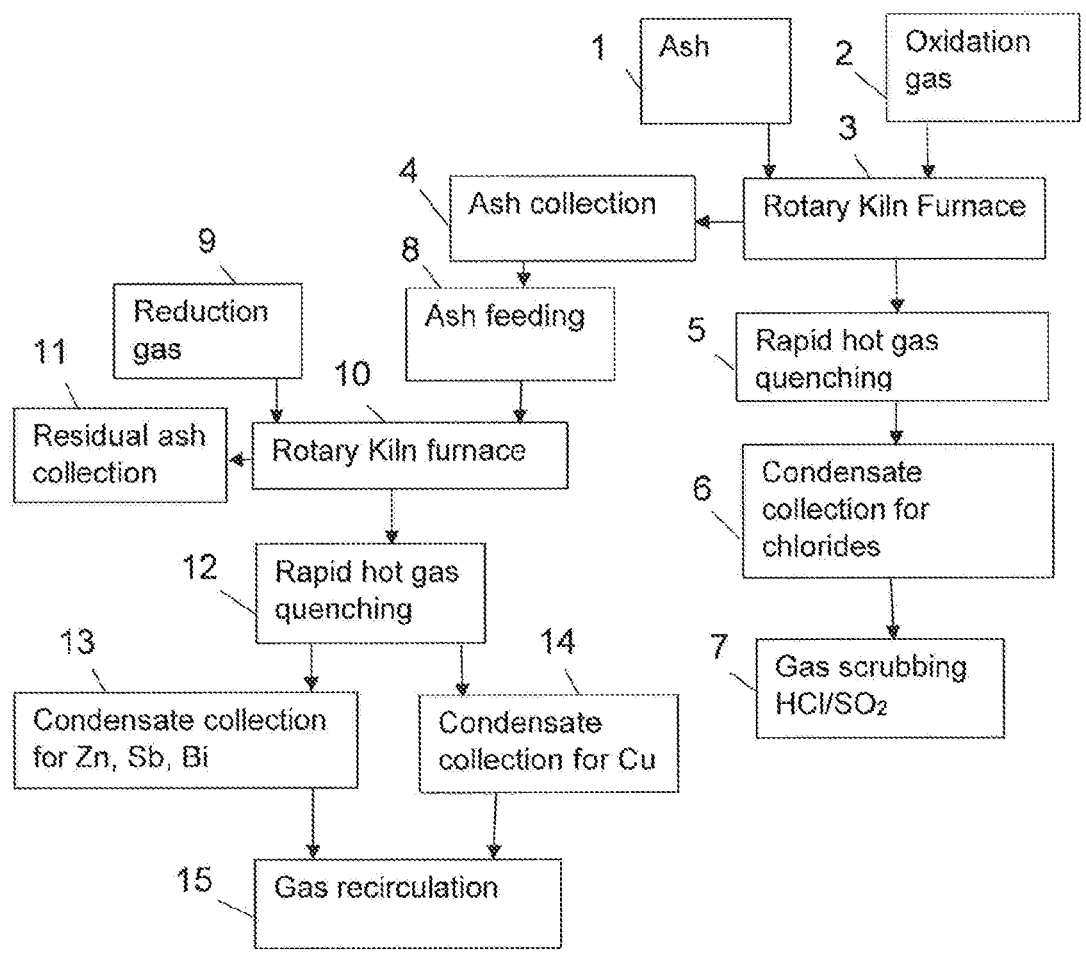
Figure 3:
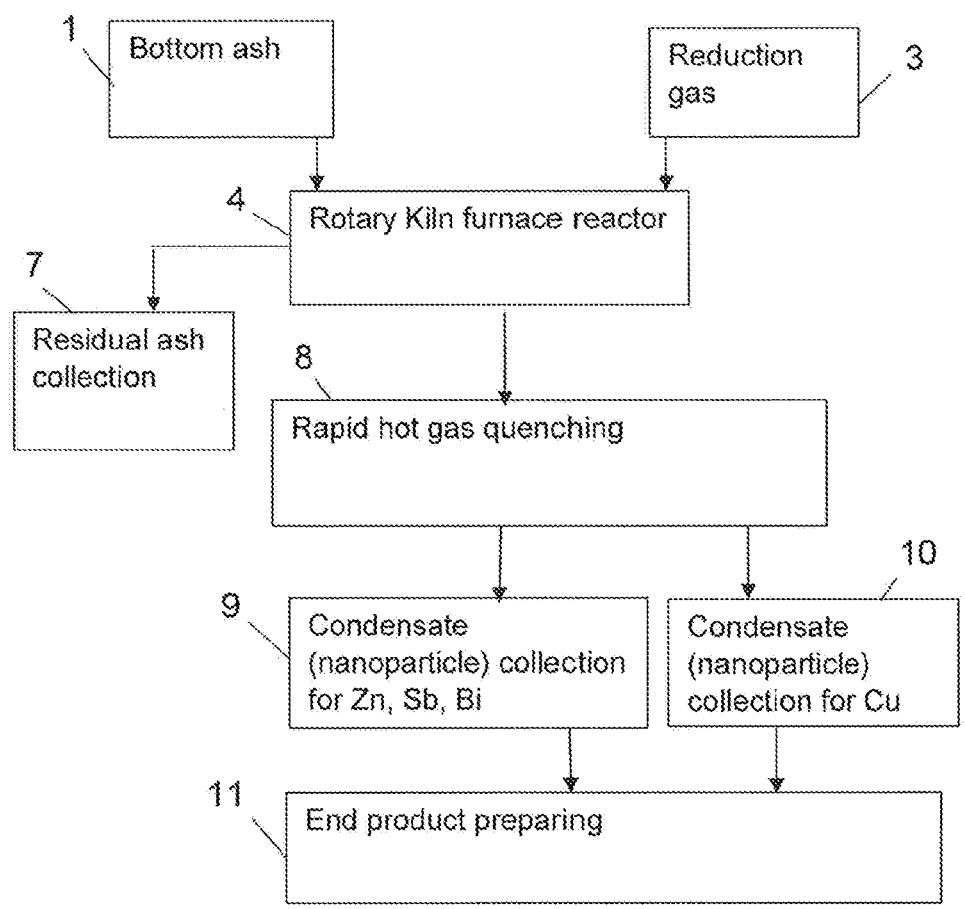
Figure 4:
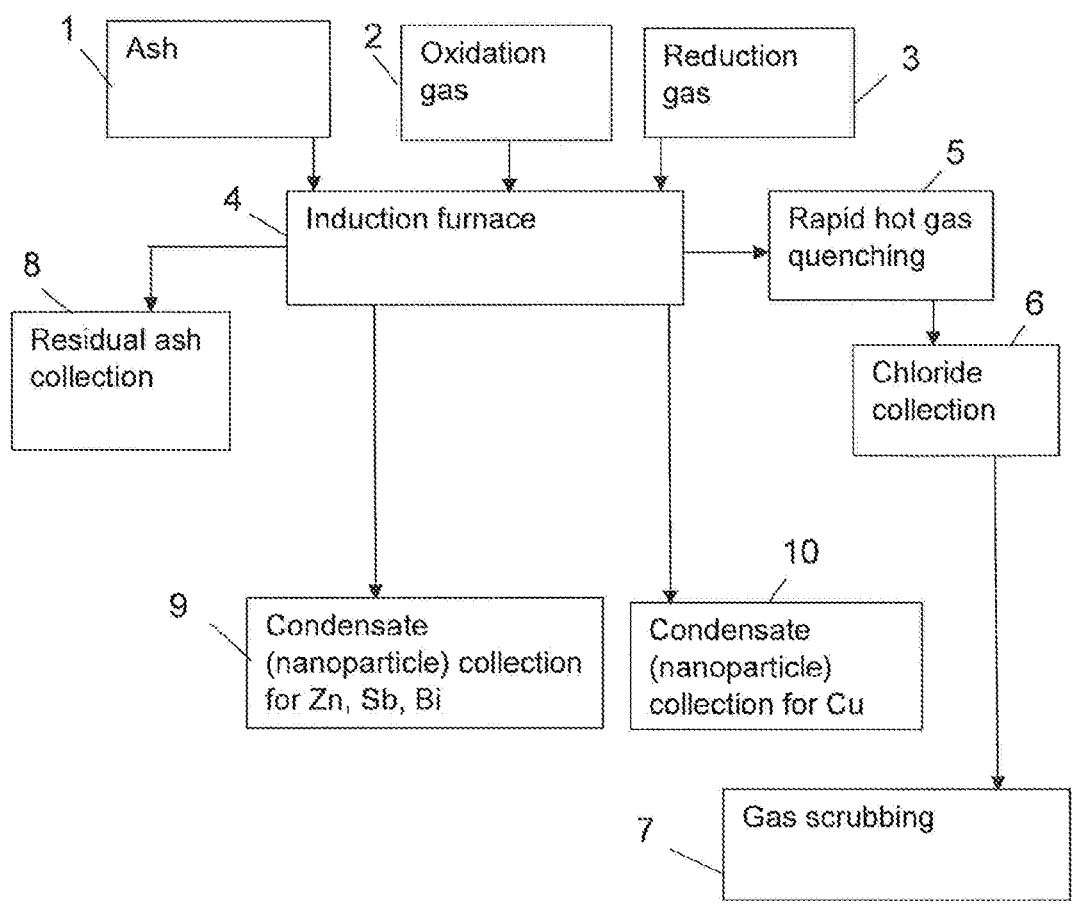

FIG. 1 is a schematic view of a first embodiment of the system of the invention for recovering metals from fly ash in a one-phase rotary kiln furnace FIG. 2 is a schematic view of a second embodiment of the system and method of the invention for recovering metals from fly ash in a two-phase rotary kiln furnace FIG. 3 is a schematic view of a third embodiment of the system and method of the invention for recovering metals from bottom ash in a rotary kiln furnace FIG. 4 is a schematic view of a fourth embodiment of the system and method of the invention for recovering metals from fly ash in an induction furnace

DETAILED DESCRIPTION

FIG. 1 is a schematic view of a first embodiment of the system and method of the invention, wherein a one phase rotary kiln furnace is used for recovering metals from fly ash. The embodiment of FIG. 1 comprises the following steps and units.

Unit 1 is a container for combustion ash, fly ash in this embodiment, from which it is fed into a continuous rotary kiln furnace referred to with reference number 4.

Unit 2 is a container for oxidizing gas, such as air, which is fed into and through the furnace 4.

Unit 3 is a container for reduction gas, such as a hydrogen gas/nitrogen gas ($H_2/N_2$) mixture, which also is fed into the furnace 4 and through that.

If the fly ash contains Cd it is volatilized in a preliminary step by feeding reducing gas, such as a $H_2/N_2$ mixture, from unit 3 into the furnace 4 and by heating the furnace 4 to a preliminary temperature of ca 500° C. The volatilized Cd is quenched in a cooling unit (not shown) with e.g. nitrogen or possibly with air and collected in a collection unit (not shown), which can consist of one or more filter bags.

The furnace 4 is then heated into a first temperature of approximately 850° C. for volatilizing (other) existing chlorides contained in the fly ash in oxidation gas, such as air. The chlorides, which mostly are in the form of NaCl and KCl, are volatilized as such. There can also be $CdCl_2$, which is volatilized. If the ash contains $CaCl_2$), the chloride is freed from $CaCl_2$) as HCl, and the Ca remains in the ash converted into CaO. There can also be chlorides of Pb and/or Cu, which also are collected as such.

The gas flow of volatilized chlorides of Na and/or K is then fed into a cooling unit 5, where they are quenched with air so that they can be collected in unit 6, unit 5 and 6 being separate from those used for quenching and collecting $CdCl_2$.

Volatilized NaCl and/or KCl are collected in a collecting unit referred to with reference number 6, which can consist of one or more filter bags. Minor amounts of lead (II) chloride ($PbCl_2$) and copper(II) chloride (CuCl) might also be found in the volatilizing chlorides. Even Cadmium chloride ($CdCl_2$) can be found, if Cd has not been removed in a preliminary step referred to above. $PbCl_2$ and CuCl can be precipitated (chrystallized) from NaCl and/or KCl products if their concentrations exceed acceptable ranges.

The gas flow now still contains hydrogen chloride (HCl), which is removed by a gas scrubber. Such a scrubber can generally be used to remove some particulates and/or gases from industrial exhaust streams. Traditionally, the term "scrubber" has referred to pollution control devices that use liquid to wash unwanted pollutants from a gas stream.

Recently, the term has also been used to describe systems that inject a dry reagent or slurry into a dirty exhaust stream to "wash out" acidic gases.

The part of the volatilizing chlorides, which are in the form of HCl gas, is left in the reactor 4 to be removed in step 7 with a scrubber.

After removal of NaCl and KCl, the conditions in the furnace 4 are changed by feeding a reducing gas flow, e.g. a $H_2/N_2$ mixture, from gas container 3 to and through the furnace 4 and by stopping the flow of oxidation gas from container 2 to furnace 4.

The heating of the fly ash is continued in the furnace 4 by heating to a temperature of approximately 1000° C. for volatilizing Zn, Bi, and Sb in the atmosphere of said reducing gas.

Non-volatilized compounds of the ash are residuals that are collected in unit 8 e.g. for manufacturing end products like catalysts or water treatment chemicals.

The gas flow with the vaporized Zn, Bi, and/or Sb is then fed into a cooling unit 9 for quenching with nitrogen or possibly air with a speed with which the vaporized metals form nanosized aerosol particles. In this step, it is important with respect to the forming of particles of nanosize that the gas flow is not cooled down before mixing it with the diluting gas used for the quenching. The place for the dilution gas inlet as well as the speed, amount and temperature of the diluting gas flow therefore have to be chosen thereafter.

It is, however, not crucial for the metal recovery itself that the particles are of nanosize, but it is advantageous for preparing end products.

The nanosized aerosol Zn, Bi, and Sb particles are then recovered in a collection unit 10, which e.g. can be a filter bag.

The heating of the fly ash is continued in the furnace 4, which now is heated into a temperature of 1000-1400° C., whereby a further part of volatilizing metals, such as Cu, in the combustion ash are volatilized in gaseous form into the gas flow.

The gas flow with the volatilized Cu and other volatilizing metals is then fed into the same cooling unit 9 as for Zn, Bi and Sb for quenching with nitrogen or air and with a velocity with which these further part of volatilized metals form nanosized aerosol particles. Generally, the velocity, temperature, and place of the quenching and diluting gas is crucial so that particles of nanosized would be formed, since the gas flow should not cool down before the quenching.

The nanosized aerosol Cu and possible other metals are then recovered in a separate collection unit 11, which also ca be a filter bag.

FIG. 2 is a schematic view of a second embodiment of the system and method of the invention, wherein a two-phase process is used for recovering metals from fly ash. The embodiment of FIG. 2 comprises the following steps and units.

Unit 1 is a container for combustion ash, fly ash in this embodiment, from which it is fed into a continuous rotary kiln furnace referred to with reference number 3.

Unit 2 is a container for oxidizing gas, such as air, which is fed into and through the furnace 3.

If the fly ash contains Cd it can be volatilized in a preliminary step by feeding reducing gas, such as a $H_2/N_2$ mixture, from unit 9 into the furnace 3 and by heating the furnace 3 to a preliminary temperature of ca 500° C. The volatilized Cd is quenched in a cooling unit (not shown) with nitrogen or possibly with air and collected in a collection unit (not shown) by filter bags.

Furnace 3 is then heated into a temperature of approximately 850° C. for volatilizing existing chlorides contained in the fly ash in oxidation gas, such as air. The chlorides, which mostly are in the form of NaCl and KCl, are volatilized as such. There might also be minor amounts of $CdCl_2$. If the ash contains $CaCl_2$), the chloride is freed from $CaCl_2$) as HCl, and the Ca remains in the ash converted into CaO.

The gas flow of volatilized chlorides is then fed into a cooling unit 5, where it is quenched with air so that they could be collected.

Volatilized NaCl and/or KCl are collected in a collecting unit referred to with reference number 6, which can consist of one or more filter bags. Minor amounts of $PbCl_2$ and CuCl might also be found in the volatilizing chlorides. Even $CdCl_2$ can be found, if Cd is not removed not removed in a preliminary step referred to above. $PbCl_2$ and CuCl can be precipitated (chrystallized) from the mixture of chlorides if their concentrations exceed acceptable ranges.

The part of the volatilizing chlorides in the form of HCl gas is left in the reactor 3 to be removed in a later step with a scrubber (see reference number 7).

After removal of NaCl and KCl, non-volatilized compounds of the fly ash are collected in unit 4 for further treatment and recovery of metals.

This ash is fed to unit 8 and from there further to a rotary kiln furnace 10.

Unit 9 is a container for reducing gas, such as a $H_2/N_2$ mixture, which also is fed as a gas flow into the rotary kiln furnace 10.

The heating of the fly ash is continued in the furnace 10 by heating to a temperature of approximately 1000° C. for volatilizing Zn, Bi, and/or Sb in the atmosphere of said reducing gas.

The gas flow with the vaporized Zn, Bi, and/or Sb is then fed into a cooling unit 12 for quenching with nitrogen or possibly air with a speed and in conditions with which the vaporized Zn, Bi, and/or Sb form nanosized aerosol particles.

The nanosized aerosol Zn, Bi, and Sb particles are then recovered in a collection unit 13, which e.g. can be a filter bag.

The heating of the fly ash is continued in the furnace 10 by heating to a temperature of approximately 1000° C.-1400° C. for volatilizing a resting part of volatilizing metals, such as Cu in the atmosphere of said reducing gas. Cu is vaporized in gaseous form into the gas flow.

The gas flow with the vaporized Cu and other resting volatilizing metals is then fed into the same cooling unit 12 as for Zn, Bi and Sb for quenching with nitrogen or possibly air with a speed and in conditions with which this part of volatilized metals form nanosized aerosol particles.

The nanosized aerosol Cu and other possible metals are then recovered in a separate collection unit 14, which also can be a filter bag.

Non-volatilized compounds of the ash are residuals that are collected in unit 11 e.g. for manufacturing end products like catalysts or water treatment chemicals.

The gas flow now still contains HCl, which is removed by a gas scrubber 15. Such a scrubber can generally be used to remove some particulates and/or gases from industrial exhaust streams.

FIG. 3 is a schematic view of a third embodiment of the system and method of the invention for recovering metals from bottom ash in a rotary kiln furnace. The embodiment of FIG. 3 comprises the following steps and units.

Unit 1 is a container for combustion ash, bottom ash in this embodiment, from which it is fed into a continuous rotary kiln furnace referred to with reference number 4.

Unit 3 is a container for reduction gas, such as a $H_2/N_2$ mixture, which is fed into and through the furnace 4.

The heating of the bottom ash is continued in the furnace 4 by heating to a temperature of approximately 1000° C. for volatilizing Zn, Bi and/or Sb in the atmosphere of said reduction gas.

The gas flow with the volatilized Zn, Bi and/or Sb is then fed into a cooling unit 8 for quenching with nitrogen or possibly air with a speed and in conditions with which the volatilized metals form nanosized aerosol particles.

The nanosized aerosol Zn, Bi, and Sb particles are then recovered in a collection unit 9, which e.g. can be a filter bag.

The heating of the bottom ash is still continued in the furnace 4 by heating to a temperature of approximately 1000° C.-1400° C. for volatilizing also a further part of volatilizing metals, such as Cu, in the atmosphere of said reducing gas and Cu is vaporized in gaseous form into the gas flow.

Non-volatilized compounds of the ash are residuals that are collected in unit 7 e.g. for manufacturing end products like catalysts or water treatment chemicals.

The gas flow containing volatilized Cu and other volatilizing metals is then fed into the same cooling unit 8 as for Zn, Bi and Sb for quenching with nitrogen or possibly air in conditions in which and with a speed with which this further part of volatilized metals form nanosized aerosol particles.

The nanosized aerosol Cu and other metals are then recovered in a separate collection unit 10, which also ca be a filter bag.

Reference number 11 stands for preparing end products. End products from Cu and Zn might be needed in cosmetics, paints, electronics, and different nanomaterials.

FIG. 4 is a schematic view of a fourth embodiment of the system and method of the invention for recovering metals from fly ash in an induction furnace. The embodiment of FIG. 4 comprises the following steps and units.

Unit 1 is a container for combustion ash, fly ash in this embodiment, from which it is fed into an induction furnace referred to with reference number 4.

Unit 2 is a container for oxidizing gas, such as air, which is fed into and through the furnace 4.

Unit 3 is a container for reducing gas, such as a $H_2/N_2$ mixture, which also is fed into the furnace 4 and through that.

If the fly ash contains Cd, it is volatilized in a preliminary step by feeding reducing gas, such as a $H_2/N_2$ mixture, from unit 3 into the furnace 4 and by heating furnace 4 to a preliminary temperature of ca 500° C. The volatilized Cd is quenched in a cooling unit (not shown) with e.g. nitrogen or possibly with air and collected in a collection unit (not shown), which can consist of one or more filter bags.

The furnace 4 is then heated into a first temperature of approximately 850° C. for volatilizing (other) existing chlorides contained in the fly as in oxidation gas, such as air. The other chlorides, which mostly are in the form of NaCl and KCl, are volatilized as such. There might be minor amounts of $CdCl_2$. If the ash contains $CaCl_2$), the chloride is freed from $CaCl_2$) as HCl, and the Ca remains in the ash converted into CaO. There can also be chlorides of Pb and/or Cu, which also are collected as such.

The gas flow of volatilized chlorides of Na and/or K is then fed into a cooling unit 5, where they are quenched with air so that they could be collected in unit 6, unit 5 and 6 being separate from those used for quenching and collecting $CdCl_2$.

Volatilized NaCl and/or KCl are collected in a collecting unit referred to with reference number 6, which can consist of one or more filter bags. Minor amounts of $PbCl_2$ and CuCl might also be found in the volatilizing chlorides. Even $CdCl_2$ can be found, if not removed in a preliminary step referred to above. $PbCl_2$ and CuCl can be precipitated (chrystallized) from NaCl and/or KCl products if their concentrations exceed acceptable ranges.

The part of the volatilizing chlorides, which are in the form of HCl gas, is left in the reactor 4 to be removed in step 7 with a scrubber. Such a scrubber can generally be used to remove some particulates and/or gases from industrial exhaust streams.

After removal of NaCl and KCl, the conditions in the furnace 4 are changed by feeding a reducing gas flow, e.g. a $H_2/N_2$ mixture, from gas container 3 to and through the furnace 4.

The heating of the fly ash is continued in the furnace 4 by heating to a temperature of approximately 1000° C. for volatilizing Zn, Bi, and Sb in the atmosphere of said reducing gas.

Non-volatilized compounds of the ash are residuals that are collected in unit 8 e.g. for manufacturing end products like catalysts or water treatment chemicals.

The vaporized metals form nanosized aerosol particles in the interaction with the gas flow. The nanosized aerosol Zn, Bi, and Sb particles are then recovered in a collection unit 9, which e.g. can be a filter bag.

The heating of the fly ash is continued in the furnace 4, which now is heated to a temperature of 1000-1400° C., whereby a further part of volatilizing metals, such as Cu, in the combustion ash are volatilized in gaseous form into the gas flow.

The nanosized aerosol Cu and possible other metals are then recovered in a separate collection unit 10, which also ca be a filter bag.

If an induction furnace is used for treatment of bottom ash, no chloride removal needs to be performed, whereby units 2, 5, 6, and 7 are not needed.

EXAMPLES

The following examples were performed to show generally the volatilities of the chlorides and metals to be covered from fly ash in the conditions of the invention.

Example 1 (Flow-Through Furnace)

Fly ash samples (0.05-1.0 g) from a grate-fired municipal solid waste incineration (MSWI) plant, with the chemical composition presented in the table below and with a maximum particle size of 250 μm, were heated in an electrically-heated, laminar flow-through tube reactor at different temperatures spanning the range 200-1050° C.

The samples were heated first in an oxidizing gas atmosphere (air) (=case a)) and then in a reducing gas atmosphere (=case b)) consisting of 10% v/v $H_2$ and 90% v/v $N_2$.

A porous tube dilutor, connected to the outlet of the reactor tube and positioned inside the reactor, was used to quench and dilute the hot product gases (Lyyränen et al., 2004; Backman et al. 2002) vaporized as a consequence of the heating.

Samples of metal condensates, which formed during said product gas quenching, were collected on quartz filter elements.

Gaseous emissions were measured with a Fourier-Transform Infrared (FTIR) gas analyser to obtain the gas composition exiting the reactor.

The volatilities of the elemental constituents of the fly ash were quantified by mass balance based on chemical analysis of the heat-treated ashes.

TABLE

Elemental composition of the municipal waste combustion plant fly ash

| Element | concentration | (dry basis) |
|---|---|---|
| C | 1.3 | % w/w |
| S | 4.2 | % w/w |
| H | <0.3 | % w/w |
| N | <0.1 | % w/w |
| Cl | 6.5 | % w/w |
| Na | 3.7 | % w/w |
| K | 3.1 | % w/w |
| P | 0.9 | % w/w |
| Ca | 16.5 | % w/w |
| Mg | 1.4 | % w/w |
| Si | 8.1 | % w/w |
| Al | 4.0 | % w/w |
| Fe | 1.3 | % w/w |
| Ti | 1.5 | % w/w |
| Zn | 1.6 | % w/w |
| Sb | 749 | mg/kg |
| As | 71 | mg/kg |
| Cd | 129 | mg/kg |
| Cr | 520 | mg/kg |
| Cu | 707 | mg/kg |
| Pb | 1346 | mg/kg |
| Mn | 829 | mg/kg |
| Ni | 100 | mg/kg |
| Sn | 653 | mg/kg |
| Bi | 26 | mg/kg |
| Co | 39 | mg/kg |
| Mo | 19 | mg/kg |
| V | 30 | mg/kg |
| Ag | 9 | mg/kg |
| Au | <1 | mg/kg |
| Tl | <1 | mg/kg |

Case a) Release of Elemental Constituents to the Gas Phase in Air

The release of chlorides calculated as chlorine commenced between 600 and 700° C. and was virtually complete (>99% released) by 900° C. The release of S commenced between 800 and 850° C. and increased to 41% with increasing temperature to 1050° C. Carbon was predominately released between 500 and 600° C. The release of C commenced below 400° C. and was more or less complete (>99% released) by 1000° C. The release of Na and K (as their chlorides) commenced between 600 and 700° C. At 900° C., around 55% of Na and 80% of K were released to the gas phase. Further heating of the fly ash above 900° C. did not result in additional release of Na and K.

Powder X-ray diffraction analysis of heat-treated ashes and thermodynamic equilibrium calculations indicated that residual Na was retained in the ashes in the form of non-volatile aluminosilicates. The release of Cd commenced between 700 and 750° C. and reached 95% by 1050° C. The release of Pb commenced between 650 and 720° C. and reached 94% by 1050° C. The release of Zn commenced around 850° C. Only a minor fraction of Zn (<15%) was released by 1050° C. Copper was released within the temperature range 700-900° C. Around 50% of Cu was released following heating at temperatures above 900° C. Bismuth was non-volatile below 1000° C. Only a minor fraction of Bi (15%) was released at 1050° C. The following elements showed negligible volatility in air below 1050° C.: P, Ca, Mg, Ti, Al, Sb, Sn, and As.

Thus, the metals to be recovered in the invention are not significantly vaporized in oxidizing conditions.

Case b) Release of Elemental Constituents to the Gas Phase in a Gaseous Mixture Consisting of 10% Hydrogen and 90% Nitrogen.

The release profiles for Cl and K in 10% $H_2$ were similar to their release profiles in air. The release of Na in 10% $H_2$ was almost identical to that in the air gas atmosphere for temperatures below 900° C. Above this temperature, Na was released to a greater extent in 10% $H_2$ than in air. The release of Na at 1050° C. in 10% $H_2$ was 78% (c.f. 53% in air at 1050° C.). Sulphur was released to a greater extent in 10% $H_2$ than in air. The release of S in 10% $H_2$ commenced between 600 and 700° C. (at least 100° C. lower than the onset temperature for S release in air). The hydrogen gas atmosphere inhibited the complete release of carbon. Around 8% of C remained in the ashes following heat-treatment at 1050° C. (c.f.<1% retention of C in air at 1050° C.). The release of Cd commenced between 290 and 400° C., and reached around 80% by 460° C. and 90% by 700° C. The release of Zn was significant at temperatures above 600° C. and reached around 80% by 900° C. and around 87% by 1050° C. The release of Pb was greater in 10% $H_2$ than in air over the temperature range 600-725° C. The extent of release of Pb was similar in 10% $H_2$ to that in air for temperatures within the range 785-1050° C. Copper was significantly less volatile in 10% $H_2$ than in air. The release of Cu was minor below 880° C. (<10% release). At 1050° C., around 25% of Cu was released to the gas phase. The release of Sb and Sn commenced between 600 and 700° C. and reached around 70-75% by 1000° C. Arsenic was released to only a minor extent (around 30% at 1050° C.). The onset of As release commenced around 700-800° C. The release of Bi commenced around 500-600° C. and reached around 85-90% by 880° C. The following elements showed negligible volatility in 10% $H_2$ below 1050° C.: P, Ti, Ca, Mg, and Al.

Example 2 (Induction Furnace)

The same fly ash sample used in Example 1 was heated in an induction furnace in a gas atmosphere consisting of $H_2$ (10% v/v) and $N_2$ (90% v/v). Samples of fly ash (10-14 g) were loaded into the induction furnace. The induction furnace was then sealed and heated to 1100° C. Material which volatilized from the fly ash at 1100° C. was quenched and then collected on a filter.

The collected condensate was composed of Zn (36.8%), K (19.0%), Na (11.5%), Pb (2.6%), Sn (0.9%) of the gravimetrically weighted mass. The resting 1.2% was composed of minor elements (Cr, Mn, Co, Ni, Cu, As, Mo, Ag, Cd, Sb, Ti, Bi) and unanalyzed, probably chlorine and sulphur, 28%.

The collected material was analysed for metal and metalloid concentrations by inductively-coupled plasma mass spectrometry (ICP-MS) following pressurized acid digestion. Treated ash residues were weighed and then analyzed for metals and metalloids by X-ray fluorescence (XRF) following sample digestion in a mixture of nitric acid and hydrochloric acid. The fractions of inorganic elements released to the gas phase were: Cl 40.6%, S 69.5%, K 40.4%, Cu 0%, Ca 41.2%, P 81.1%, Pb 76.1% and for Zn 97.2%.

Thermal Fractionation of the Element Constituents of Fly Ash

Metal and metalloid contaminated MSWI fly ash can be heat-treated in two stages to achieve favourable fractionation of metals and metalloids. In the first stage, fly ash is heated at 900° C. in air to remove chlorides (>99% removal calculated as Cl), C (>98% removal), and significant amounts of K, Na, Cd, Pb, and Cu from the ash removed in the form of chlorides.

The volatilized material can be quenched by hot gas dilution (Lyyränen et al., 2004, Backman et al. 2002) and then collected in an electrostatic precipitator (ESP) or bag filter. The collected material can potentially be utilized as road salt.

In the second stage of treatment, the hot (900° C.) reactor is purged of oxygen by flushing with nitrogen gas, and then hydrogen is fed into the reactor to create a gas atmosphere consisting of both hydrogen and nitrogen. The second stage of treatment causes Zn to volatilize and small amounts of valuable commodity elements, particularly Sn, Sb, and Bi, to volatilize. Antimony and bismuth are both classified as critical raw materials by the EU (http://ec.europa.eu/qrowthisectors/raw-materials/specific-interesticritical/).

Volatilized material is then quenched by hot gas dilution (Lyyränen et al., 2004) to form a zinc-rich condensate. The condensate can be collected in an ESP or bag filter. Gaseous zinc is transformed into zinc nanoparticles during hot gas dilution. The zinc nanoparticles can potentially be used to produce various high-value products (e.g. sunscreens, paints, electronics, solar cells, sensors etc.).

A similar procedure as for Zn can be performed later for Cu, especially for bottom ash, because there are no chlorides a relatively large amounts of Cu, but at a higher reactor temperature as Cu starts to vaporize at around 1100° C. and is completed at around 1350° C. according to chemical equilibrium.

REFERENCES

Lyyränen, J., Jokiniemi, J., Kauppinen, E. I., Backman, U., Vesala, H. Comparison of Different Dilution Methods for Measuring Diesel Particle Emissions (2004) Aerosol Science and Technology, 38 (1), pp. 12-23

Backman, U., Jokiniemi J. K., Auvinen, A., Lehtinen, K. E. J. (2002) The Effect of Boundary Conditions on Gas Phase Synthesised Silver Nanoparticles, Journal of Nanoparticle Research 4:325-335.

The invention claimed is:

1. A method for treatment of combustion ash for metal recovery, the method comprising the steps of:
   a) heating a continuous flow-through furnace to a first temperature,
   b) feeding a combustion ash into the continuous flow-through furnace,
   c) feeding oxidizing gas through the continuous flow-through furnace,
   d) heating the combustion ash fed into the continuous flow-through furnace in the first temperature for volatilizing chlorides contained in the ash, and removing the chlorides, wherein removing the chlorides is performed in a first rotary kiln furnace, and wherein, after removing the chlorides is performed, the combustion ash is fed to a second rotary kiln furnace for performing step f),
   e) changing the conditions in the continuous flow-through furnace by feeding a reducing gas flow through the continuous flow-through furnace,
   f) changing the temperature of the continuous flow-through furnace to a second temperature for heating the combustion ash in the furnace for volatilizing one or more metals contained in the ash into the gas flow, and
   g) recovering the vaporized particles in one or more collection units.

2. The method of claim 1, wherein the combustion ash is selected from one of bottom ash or fly ash, fly ash containing one or more of Si, Ca, Al, Zn, Na, Sb, Bi, K, Fe, Co, Cu, Ni, and/or V and bottom ash containing Si, Al, Zn, Sb, Bi, Fe, Co, Cu, Ni, and/or V.

3. The method of claim 1, wherein the combustion ash is bottom ash and the first temperature is sufficient for volatilizing Zn, Bi, and/or Sb.

4. The method of claim 1, wherein in step f), the resting volatilizing metals in the combustion ash are volatilized in gaseous form into the gas flow, and thereafter performing step g) also for Cu.

5. The method of claim 1, wherein the reduction gas in step e) is a mixture of nitrogen and hydrogen gases and/or carbon monoxide, CO, gas.

6. The method of claim 1, wherein the gas flow with the volatilized gases are quenched before the recovering step g).

7. The method of claim 6, wherein the quenching is performed with a quenching gas before the gas flow with the volatilized metals are cooled down in such conditions and with such a speed that aerosol particles of nanosize are formed.

8. The method of claim 1, wherein the combustion ash comprises fly ash and at least one of Na, K, Ca, and Cd.

9. The method of claim 1, wherein the first temperature for volatilizing chlorides is from 800° C. to 900° C. and the second temperature for volatilizing metals in step f) is sufficient for volatilizing Zn, Bi and Sb.

10. The method of claim 1, wherein the oxidizing gas for volatilizing chlorides of one or more of Na, K, Cu, Pb, is a gas flow of air fed into the furnace.

11. The method of claim 1, wherein the chlorides are removed after volatilizing and quenching by collecting with filter bags.

12. The method of claim 1, wherein the heating of the combustion ash is continued after step f) in the furnace by raising the temperature into a third temperature, whereby resting volatilizing metals in the combustion ash are volatilized in gaseous form into the gas flow, and thereafter performing step g) for Cu and said other vaporized gases.

13. The method of claim 1, wherein Cd is volatilized and removed before step a) by feeding a reducing gas through the furnace heated into a preliminary temperature for volatilizing Cd.

14. The method of claim 1, wherein step f) is performed in the first rotary kiln furnace.

15. The method of claim 1, wherein the metals are recovered by collecting with a filter.

16. The method of claim 1, wherein compounds not volatilized in step f) are residuals and they are separated, heated, and pulverized.

17. The method of claim 16, wherein the compounds not volatilized in step f) are Si, Ca, Al, Fe, Co, Mg, Ni, P, Ti, As, and V and non-volatile forms of Na and K.

* * * * *